United States Patent Office 3,313,516
Patented Apr. 11, 1967

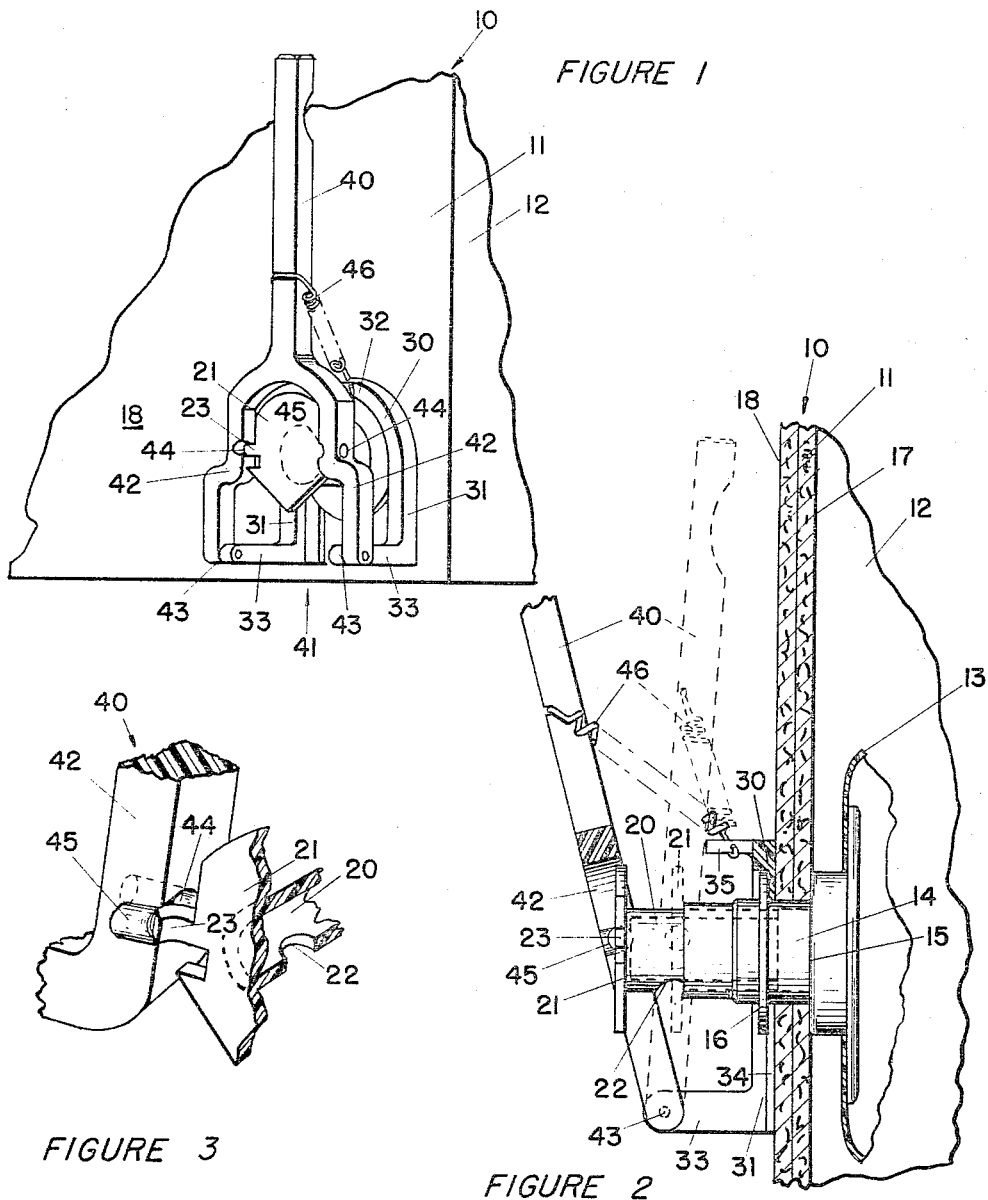

3,313,516
SPRING BIASED VALVE OPERATING LEVER
Clarence G. Peterson, Spokane, Wash., assignor of twenty-five percent to Harold G. Anderson, Wesley B. Anderson, Roy H. Nyholm and Harold Anderson, Jr., all of Spokane, Wash.
Filed Jan. 14, 1965, Ser. No. 425,552
7 Claims. (Cl. 251—144)

This invention relates to valves and more particularly to operating devices for valves.

It is an object of the present invention to provide a valve operating lever which may be releasably secured to a telescopically operated valve to facilitate operation of said valve.

It is another object of the present invention to provide in combination with a dispenser, for a liquid comestible, having a telescopically operated valve, a valve operating device which will enable one to actuate the valve by manipulating the lever.

It is yet another object of the present invention to provide a valve operating lever which is mounted upon a unique U-shaped base adapted to be secured relative to a valve by sliding a flange formed on the base under a flange provided on the said valve.

These and other objects of the invention will become apparent during the course of the following description when considered in conjunction with the accompanying drawings wherein like numerals are employed to designate like parts.

In the drawing I have shown a preferred form of my present invention, but it is to be understood that modifications are contemplated within the scope of the appended claims.

In the drawing:

FIGURE 1 is an isometric view of the corner of a container having a valve with which the lever constituting the subject matter of this invention is associated;

FIGURE 2 is a vertical sectional view showing my improved valve operating lever associated with the valve supported in a wall of a container shown in section; and FIGURE 3 is a fragmentary perspective view of an arm showing one method of association with the head of the reciprocating plug.

Having reference now more particularly to the drawings, I have shown a rigid container indicated in its entirety by the numeral 10 which has the customary front and side walls 11 and 12 shown and includes a top, bottom and end wall (not shown) to provide a complete enclosure. It is conventional to maintain within the container a pliable plastic bag 13 which may be of one or more laminations and which includes a valve having a body 14 having inner and outer spaced flanges 15 and 16 which constitute stops adapted to be disposed on the inner and outer faces 17 and 18 of the wall 11, thus fixing the valve body with respect to the wall 11 of the container 10 in a convenient manner which is now well known. Associated with the valve body is a tubular plug 20 which is closed at its outer end by a head 21 and is provided with a radially disposed discharge orifice 22. When the plug 20 is moved telescopically with respect to the body 14 to the inward position, as shown by dotted lines of FIGURE 2, the orifice 22 is sealed off against passage of the fluid from the bag 13 by the tubular body 14. When it is moved outwardly to the full line position of FIGURE 2, the fluid within the bag 13 may, by gravity, flow from the orifice 22 thus providing a valving device having a telescopically associated plug. The head 21 is provided with axially aligned ears 23—23 which are disposed one at each side of the head on an axis disposed at right angles to the axis of the orifice 22 and athwart of the axis of the plug 20. It will be understood that preferably the ears 23 of the plug 20 are formed from a semi-rigid material which, when sufficient pressure is exerted, may be deflected as seen in FIGURE 3 of the drawing. However, it will be understood that this inherent feature is not absolutely necessary to the proper functioning of the device since other means of pivotally associating the head 21 with the valving device (to be subsequently described) will be obvious to those skilled in the art.

To provide means for automatically returning the plug 20 to the closed or dotted line position of FIGURE 2 and to facilitate the manual manipulation of the valve by telescopic movement of the plug 20, I provide a valve operating device which comprises a U-shaped base or yoke 30 having a pair of spaced parallel legs 31—31 united by an arcuate bridge 32 at one end and having perpendicular right angle fingers 33 at their free ends. An inwardly directed planar flange 34 is coincident to the legs 31 and bridge 32 and is spaced apart sufficiently to receive the tubular body of the valve 14 as seen in FIGURES 1 and 2. The valve operating device is secured relative to the valve and container by having the flange 34 confined between the flange 16 and the face 18 of the wall 11.

Midway the spaced legs 31—31 the bridge 32 is provided with a forwardly projecting lip 35 which constitutes a stop for the lever 40 when in its retracted or closed-valve position as seen by broken line of FIGURE 2. At its lower end, the lever 40 is provided with a bifurcation 41 defined by a pair of spaced arms 42—42 each of which is pivotally connected at 43 to the outer or free ends of the fingers 33 on an axis at right angles to the axis of the lever to enable the lever 40 to be rocked or tilted in a plane perpendicular to a plane of the flange 34. The spacing of the arms 42—42 is sufficient to straddle the head 21 and each arm is provided with a recess 44 axially aligned with the other recess and adapted to receive the ears 23 of the head 21. The recesses 44 may be axially aligned bores formed in the arms 42 which have guiding grooves 45 passing laterally through the arms and terminating at the inwardly disposed mouths of the recesses 44.

It will thus be seen that as the lever 40 is rocked between the full and broken line positions of FIGURE 2, the valving plug 20 will be shifted from a valve-closed position to a valve-open position to facilitate manual operation of the valving device. To ensure against accidental opening of the valving device, I provide biasing means 46 which may be a tension spring secured at one end to the lever 40 and at the opposite end with respect to the base 30, for example, by securing it to the lip 35 as shown. It will thus be seen that release of the lever 40 will permit the spring 36 to withdraw the lever 40 to the broken line position and thus shift the plug 20 to the valve-closed position.

Having thus described my invention, I desire to secure by Letters Patent of the United States the following:

1. The combination with a dispenser for a liquid comestible including a pliable plastic bag fixed to and communicating with a valving device having a tubular body fixed in a wall of a rigid container enclosing said plastic bag and for discharging the contents thereof; and a plug telescopically associated with said body for valving association therewith; of a valve operating device comprising:

a base;
means releasably fixing said base with respect to said body;
a lever pivotally associated with said base and extending athwart of the axis of telescopic movement of said plug;
means interconnecting said plug and said lever for actuating said plug by manually rocking said lever; and means biasing said lever to releasably maintain said plug in a normal closed-valve position.

2. The combination with a dispenser for a liquid comestible including a pliable plastic bag fixed to and communicating with a valving device having a tubular body releasably fixed in a wall of a rigid container enclosing said plastic bag and for discharging the contents thereof; and a plug telescopically associated with said body for valving association therewith; of a valve operating device, comprising:

a base;

means releasably fixing said base to said body;

a lever pivotally associated with said base and extending athwart of the axis of telescopic movement of said plug;

means interconnecting said plug and said lever for actuating said plug by manually rocking said lever; and means biasing said lever to releasably maintain said plug in a normal closed-valve position.

3. The combination with a dispenser for a liquid comestible including a container having a rigid outer shell having an aperture and surrounding a collapsible impervious bag including a valving device having a tubular body for discharging the contents of said bag and a plug telescopically associated wtih said body for valving association therewith;

said body having means fixing the valving device in said aperture and including a radial flange disposed outwardly of said shell; of a valve operating device comprising:

a U-shaped base straddling said body;

said base having an inwardly directed flange disposed between said radial flange and said shell whereby to releasably fix said base with respect to said body;

a lever pivotally associated with said base and extending athwart of the axis of telescopic movement of said plug;

means interconnecting said plug and said lever for actuating said plug by manually rocking said lever; and means biasing said lever to releasably maintain said plug in a normal closed-valve position.

4. The combination with a dispenser for a liquid comestible including a rigid outer shell having an aperture and surrounding a collapsible impervious bag including a valving device having a tubular body for discharging the contents of said bag and a plug telescopically associated with said body for valving association therewith; a head on said plug;

diametrically disposed ears on said head;

a base;

a lever pivotally associated with said base and extending athwart of the axis of telescopic movement of said plug;

said lever having a bifurcation straddling said head and sockets pivotally receiving said ears for actuating said plug by manually rocking said lever;

means releasably fixing said base with respect to said body;

means interconnecting said plug and said lever for actuating said plug by manually rocking said lever; and means biasing said lever to releasably maintain said plug in a normal closed-valve position.

5. The combination with a dispenser for a liquid comestible including a pliable plastic bag fixed to and communicating with a valving device having a tubular body fixed in a wall of a rigid container enclosing said plastic bag and for discharging the contents thereof; and a plug telescopically associated with said body for valving association therewith; of a valve operating device comprising:

a base;

means releasably fixing said base with respect to said body;

a lever pivotally associated with said base and extending athwart of the axis of telescopic movement of said plug;

means interconnecting said plug and said lever for actuating said plug by manually rocking said lever; and a tension spring fixed to said lever and said base to releasably maintain said plug in a normal valve-closed position.

6. A valve operating lever, comprising:

a U-shaped base having spaced legs for straddling a valved dispensing device and terminating in free ends;

said base having a flange directed inwardly thereof on a level coincident to the said legs;

a lever having a bifurcation at one end defining spaced arms terminating in free ends;

the free ends of each said arm being pivotally associated with a corresponding free end of each said leg for coaxial rocking movement in a plane perpendicular to the said base flange;

said arms having coaxial ear receiving recesses spaced inwardly from their free ends and parallel to the axis of rocking movement and spring means connected to said base and said lever and urging said lever toward said base.

7. A valve operating lever, comprising:

a base;

means for releasably securing said base with respect to a valve;

a lever;

said lever having a bifurcation at one end defining spaced arms terminating in spaced free ends;

the said free ends being pivotally associated with said base for rocking movement of said lever toward and away from said base;

means on said arms for attachment to a movable valve operating portion of a valve; and means yieldably urging said lever toward said base.

References Cited by the Examiner

UNITED STATES PATENTS

| 1,034,085 | 7/1912 | Copley | 251—238 |
| 1,805,821 | 5/1931 | Haig | 251—156 |
| 2,558,272 | 6/1951 | Rubenstein | 222—509 |
| 2,941,700 | 6/1960 | Gable | 222—509 |
| 3,223,117 | 12/1965 | Curie | 251—114 |

M. CARY NELSON, *Primary Examiner.*

W. CLINE, *Assistant Examiner.*